(12) United States Patent
Trostle et al.

(10) Patent No.: US 7,089,211 B1
(45) Date of Patent: Aug. 8, 2006

(54) DIRECTORY ENABLED SECURE MULTICAST GROUP COMMUNICATIONS

(75) Inventors: Jonathan Trostle, Cupertino, CA (US); Raymond Bell, Mill Valley, CA (US); Ramprasad Golla, Milpitas, CA (US); Sunil Srivastava, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/482,156

(22) Filed: Jan. 12, 2000

(51) Int. Cl.
*H04L 12/18* (2006.01)
*H04L 29/06* (2006.01)

(52) U.S. Cl. .............................. 705/51; 705/52; 705/53; 705/54; 705/55; 705/56; 705/57

(58) Field of Classification Search ................ 705/51, 705/50, 52, 53, 54, 55, 56, 57, 58, 59, 60; 348/207; 713/201; 380/284

See application file for complete search history.

(56) References Cited

U.S. PATENT DOCUMENTS

| 4,200,770 A | 4/1980 | Hellman et al. |
| 4,531,020 A | 7/1985 | Wechselberger et al. |
| 4,578,531 A | 3/1986 | Everhart et al. |

(Continued)

FOREIGN PATENT DOCUMENTS

| EP | 0 952 718 A2 | 4/1999 |
| GB | 0 994 600 A2 | 6/1999 |

OTHER PUBLICATIONS

Guaranteed Partial Key—Escrow (Micall, Sylvio; Laboratory for computer science, MIT Aug. 1995).
Verifiable Partial Key Escrow (Bellare, M; Goldwasser, S; Proceedings of the Fourth Annual Conference on Computer and Communications Security, ACM, 1997).
Alternative to RSA: Using Diffie–Hellman with DSS (Cylink Corporation Resources).
Koblitz, Neal, A Course in Number Theory and Cryptography, 1994, Springer–Verlag New York Inc. 2nd Edition, 8 pages.
IEEE Transactions On Information Theory, vol. IT–22, No. 6 (Nov. 1976) entitled "New Directions in Cryptography" by Whitfield Diffie and Martin E. Hellman.
Proceedings of the IEEE, vol. 76, No. 5 (May 1988) entitlted "The First Ten Years of Public–Key Cryptography" by Whitfield Diffe.
MIT/LCS/TM–537, Laboratory for Computer Science (Aug. 1995) entitled "Guaranteed Partial Key–Escrow", Handout #13, by Silvio Micali.

(Continued)

*Primary Examiner*—James P. Trammell
*Assistant Examiner*—Cristina Sherr
(74) *Attorney, Agent, or Firm*—Hickman Palermo Truong & Becker LLP

(57) ABSTRACT

An approach for establishing secure communication among multiple multicast groups using a multi-master directory is disclosed. The multi-master directory is on a per object and per attribute access controls basis. The event service nodes, which can implemented as event servers, are distributed throughout an enterprise domain. The attributes of the event service nodes include the group session key and the private keys of the event service nodes. A standardized authentication service is used to register publishers and subscribers. These publishers and subscribers can individually belong to multiple multicast groups under a readily scalable, secure network architecture.

30 Claims, 11 Drawing Sheets

U.S. PATENT DOCUMENTS

| | | | | |
|---|---|---|---|---|
| 4,776,011 | A | | 10/1988 | Busby .................... 705/56 |
| 4,881,263 | A | | 11/1989 | Herbison et al. |
| 5,309,516 | A | | 5/1994 | Takaragi et al. |
| 5,351,295 | A | | 9/1994 | Perlman et al. |
| 5,361,256 | A | | 11/1994 | Doeringer et al. |
| 5,588,060 | A | | 12/1996 | Aziz .................... 705/51 |
| 5,588,061 | A | | 12/1996 | Ganesan et al. |
| 5,600,642 | A | | 2/1997 | Pauwels et al. |
| 5,630,184 | A | | 5/1997 | Roper et al. |
| 5,633,933 | A | | 5/1997 | Aziz |
| 5,663,896 | A | | 9/1997 | Aucsmith |
| 5,724,425 | A | | 3/1998 | Chang et al. |
| 5,748,736 | A | | 5/1998 | Mittra |
| 5,761,305 | A | | 6/1998 | Vanstone et al. |
| 5,805,578 | A | | 9/1998 | Stirpe et al. |
| 5,832,229 | A | | 11/1998 | Tomoda et al. |
| 5,841,864 | A | | 11/1998 | Klayman et al. |
| 5,850,451 | A | | 12/1998 | Sudia .................... 705/51 |
| 5,889,865 | A | | 3/1999 | Vanstone et al. ........... 705/51 |
| 5,920,630 | A | | 7/1999 | Wertheimer et al. ......... 705/57 |
| 5,987,131 | A | | 11/1999 | Clapp |
| 6,009,274 | A | | 12/1999 | Fletcher et al. |
| 6,049,878 | A | | 4/2000 | Caronni et al. |
| 6,055,575 | A | | 4/2000 | Paulsen et al. |
| 6,088,336 | A | | 7/2000 | Tosey |
| 6,119,228 | A | * | 9/2000 | Angelo et al. ............. 713/180 |
| 6,151,395 | A | | 11/2000 | Harkins |
| 6,216,231 | B1 | * | 4/2001 | Stubblebine ................ 713/201 |
| 6,226,383 | B1 | | 5/2001 | Jablon |
| 6,240,188 | B1 | * | 5/2001 | Dondeti et al. ............. 380/284 |
| 6,240,513 | B1 | | 5/2001 | Friedman et al. |
| 6,247,014 | B1 | | 6/2001 | Ladwig et al. |
| 6,256,733 | B1 | | 7/2001 | Thakkar et al. |
| 6,263,435 | B1 | | 7/2001 | Dondeti et al. |
| 6,272,135 | B1 | | 8/2001 | Nakatsugawa |
| 6,279,112 | B1 | * | 8/2001 | O'Toole, Jr. et al. ....... 713/201 |
| 6,295,361 | B1 | | 9/2001 | Kadansky et al. |
| 6,330,671 | B1 | | 12/2001 | Aziz |
| 6,332,163 | B1 | * | 12/2001 | Bowman-Anuah .......... 709/231 |
| 6,363,154 | B1 | | 3/2002 | Peyravian et al. |
| 6,483,921 | B1 | | 11/2002 | Harkins |
| 6,507,562 | B1 | | 1/2003 | Kadansky et al. |
| 6,570,847 | B1 | | 5/2003 | Hosein |
| 6,584,566 | B1 | | 6/2003 | Hardjono |
| 6,633,579 | B1 | | 10/2003 | Tedijanto et al. |
| 6,636,968 | B1 | | 10/2003 | Rosner et al. |
| 6,643,773 | B1 | | 11/2003 | Hardjono |
| 6,684,331 | B1 | | 1/2004 | Srivastava |
| 6,745,243 | B1 | | 6/2004 | Squire et al. |

OTHER PUBLICATIONS

Proceedings of the Fouth Annual Conference on Computer and Communications Security, ACM, 1997 (Nov. 1996) entitled "Verifiable Partial Key Escrow" by Mihir Bellare and Shafi Goldwasser.

Federal Information Processing Standards Publication 185 (Feb. 9, 1994) entitled "U.S. Department of Commernce/National Institute of Standards and Technology", Escrowed Encryption Standard, Category: Telecommunications Security.

Cylink Corporation Resources entitled "Alternatives to RSA: Using Diffie–Hellman with DSS".

Robert Orfali et al., "The Essential Distributed Objects Survival Guide," 1996, pp. 448–449.

David Chappell, "Understanding Microsoft Windows 2000 Distributed Services," 2000, pp. 319–324.

Robert Orfali et al., "Client/Server Survival Guide Third Edition," 1999, p. 488.

Alfred J. Menezes, "Handbook of Applied Crptography," CRC Press LLC., pp. 519–520.

Bruce Schneier, "Applied Crptography," 1996, John Wiley & Sons, Inc., pp. 33–35 and 47–65.

Harry Newton, Newton's Telecom Dictionary, 1998, Telecom Books, 14th Edition, p. 228.

* cited by examiner

Registration for Group Key Message

Reregister Message

Event Message

DIRECTORY ENABLED SECURE MULTICAST GROUP COMMUNICATIONS

FIELD OF THE INVENTION

The invention relates to cryptographic communication systems, and more specifically, to achieving secure communication within numerous multicast groups using directory-enabled networking.

BACKGROUND OF THE INVENTION

The proliferation of network computing has shaped how society conducts business and personal communication. As reliance on computer networks grows, the flow of information between computers continues to increase in dramatic fashion. Accompanying this increased flow of information is a proportionate concern for network security. Commercial users, who regularly conduct business involving the exchange of confidential or company proprietary information over their computer networks, demand that such information is secure against interception by an unauthorized party or to intentional corruption. In addition, with the acceptance of electronic commerce over the global Internet, all users recognize the critical role cryptographic systems play in maintaining the integrity of network communication.

Cryptography is the art and science of keeping messages secure. A message is information or data that is arranged or formatted in a particular way. In general, a message, sometimes referred to as "plaintext" or "cleartext," is encrypted or transformed using a cipher to create "ciphertext," which disguises the message in such a way as to hide its substance. In the context of cryptography, a cipher is a mathematical function that can be computed by a data processor. Once received by the intended recipient, the ciphertext is decrypted to convert the ciphertext back into plaintext. Ideally, ciphertext sufficiently disguises a message in such a way that even if the ciphertext is obtained by an unintended recipient, the substance of the message cannot be discerned from the ciphertext.

Many different encryption/decryption approaches for protecting information exist. In general, the selection of an encryption/decryption scheme depends upon considerations such as the types of communications to be made more secure, the particular parameters of the network environment in which the security is to be implemented, and the desired level of security. An important consideration is the particular system on which a security scheme is to be implemented since the level of security often has a direct effect on system resources.

For example, for small applications that require a relatively low level of security, a traditional restricted algorithm approach may be appropriate. With a restricted algorithm approach, a group of participants agree to use a specific, predetermined algorithm to encrypt and decrypt messages exchanged among the participants. Because the algorithm is maintained in secret, a relatively simple algorithm may be used. However, in the event that the secrecy of the algorithm is compromised, the algorithm must be changed to preserve secure communication among the participants. Scalability, under this approach, is a problem. As the number of participants increases, keeping the algorithm secret and updating it when compromises occur place an undue strain on network resources. In addition, standard algorithms cannot be used since each group of participants must have its own unique algorithm.

To address the shortcomings of traditional restricted algorithm approaches, many contemporary cryptography approaches use a key-based algorithm. Generally two types of key-based algorithms exist: symmetric algorithms and asymmetric algorithms, of which one example is a public key algorithm. As a practical matter, a "key" forms one of the inputs to a mathematical function that is used by a computer or processor to generate a ciphertext.

Public key algorithms are designed so that the key used for encryption is different than the key used for decryption. These algorithms are premised on the fact that the decryption key cannot be determined from the encryption key, at least not in any reasonable amount of time with practical computing resources. Typically, the encryption key (public key) is made public so that anyone, including an eavesdropper, can use the public key to encrypt a message. However, only a specific participant in possession of the decryption key (private key) can decrypt the message.

Public key algorithms, however, often are not employed as a mechanism to encrypt messages, largely because such algorithms consume an inordinate amount of system resources and time to encrypt entire messages.

As a result, a public key cryptosystem is utilized to establish a secure data communication channel through key exchanges among the participants. That is, two or more parties, who wish to communicate over a secure channel, exchange or make available to each other public (or non-secure) key values. In the Diffie-Hellman algorithm, each party uses the other party's public key value to privately and securely compute a secret key, using an agreed-upon algorithm. The parties then use their derived secret keys in a separate encryption algorithm to encrypt messages passed over the data communication channel. Conventionally, these secret keys are valid only on a per communication session basis, and thus, are referred to as session keys. These session keys can be used to encrypt/decrypt a specified number of messages or for a specified period of time.

A typical scenario involves participants, A, B, in which user A is considered a publisher of a message to a subscriber, user B. The public key algorithm used to establish a secure channel between publisher, A, and subscriber, B, is:

1. B provides a public key, B, to A.
2. A generates a random session key SK, encrypts it using public key B and sends it to B.
3. B decrypts the message using private key, b (to recover the session key SK).
4. Both A and B use the session key SK to encrypt their communications with each other; after the communication session, A and B discard SK.

This approach provides the added security of destroying the session key at the end of a session, thereby, providing greater protection against eavesdroppers.

Once a multicast group is established, management of the session's keys due to membership changes poses a number of problems. Forward secrecy, which arises when a member node leaves the multicast group and may still possess the capability to decipher future messages exchanged among the group, becomes a concern. In addition, in the case where a new member node enters the multicast group, the new member should not, in general, be permitted to decrypt the past messages of the multicast group. Another consideration involves the expediency of session key updates when a "join" or "leave" occurs, as not to inject undue system delay. This issue relates to how well the network scales to accommodate additional users.

FIG. 1 is a block diagram of one approach to establish secure communication that employs a third party, called a key distribution center (KDC), to regulate the exchange of keys. A single central group controller (GC) 1001 is responsible for distributing, creating, and updating session keys to the members of the multicast group comprising users A–H. The users A–H communicate with the group controller 1001 via separate point-to-point connections 1003 to obtain the dynamic group session key.

Channels 1003 can be made secure by using a standard Diffie-Hellman key exchange protocol. To set up the secured channel among the nodes, N–1 messages are exchanged, wherein N is the number of nodes. Although this is relatively low overhead in terms of the number of messages that are exchanged, a major drawback is that the centralized group controller 1001 represents a single point of failure, so that the system lacks fault tolerance. If the group controller 1001 is down, no secure communication can exist among the multicast group of users A–H. This is unacceptable, especially in mission critical systems.

Another drawback is that the group controller 1001 is a potential bottleneck in the network. For instance, if multiple nodes request to join the multicast group, the group controller 1001 may not be able to process such requests in a timely manner; this problem is especially pronounced if the multicast group is distributed over a wide area network (WAN).

Further, the group controller 1001 does not scale well, due, in part, to physical hardware constraints.

Network entities share information in a variety of ways. One mechanism for sharing keys in a network involves use of a directory. A known standard for directory services is the X.500 standard, which was developed by the ITU (International Telecommunications Union). Directories traditionally provide services such as white pages to track e-mail addresses along with other user information (e.g., telephone and fax numbers) on a global scale. Conventional implementations of directories lack an integrated security mechanism with the network entities.

Based upon the foregoing, there is a clear need for improved approaches to key exchange that eliminates single points of failures, especially among broadcast or multicast group members.

In particular, there is an acute need for an improved approach to enhance scalability and fault tolerance, particularly over a WAN.

There is also a need for integrating directory services with security network mechanisms.

Based on the need to provide secure communication while limiting the adverse effects on system resources and the limitations in the prior approaches, an approach for providing secure communication that provides a relatively high level of security while requiring relatively fewer system resources and time to perform is highly desirable.

SUMMARY OF THE INVENTION

Broadly, the invention provides an approach for achieving scalable secure communication within multiple multicast groups. The size of the groups is unlimited, unless the underlying multicast networking infrastructure imposes limits. According to one aspect of the invention, a method is provided for creating a plurality of secure multicast groups. The method involves, in one embodiment, creating event types in a multi-master directory. Events are defined as multicasted messages. Publishers are network entities that send events to subscribers who receive events. The multi-master directory provides access controls on a per object and per attribute basis. The subscribers and publishers are authenticated, and each of the subscribers and the publishers has a secret key. The subscribers and the publishers access the directory to determine events that they may process.

The method further includes registering the subscribers and the publishers with an event server. The event server determines whether the publishers are authorized to produce certain events corresponding to the event types and whether the subscribers are authorized to receive the certain events. If so, a group session key is generated for establishing one of the multicast groups. The group session key is encrypted in a message that has a prescribed format. The subscribers receive the message. Additionally, the method includes determining whether the received message corresponds to a correct key version, updating the group session key by the event server, and selectively reregistering the subscribers. An event server is co-located with each directory service.

According to another aspect of the invention, a communication system for creating a plurality of secure multicast groups comprises a plurality of event service nodes. A plurality of nodes is configured for functioning as a subscriber and a publisher, wherein each of the nodes has a private key. An event server is coupled to the plurality of nodes. The event servers is responsible for registering the plurality of nodes, and for determining whether the nodes are authorized to produce certain events when the nodes are functioning as publishers, and whether the nodes are authorized to receive the certain events when the nodes are functioning as subscribers. A multi-master directory comprises a directory server for communicating with one or more of the nodes to authenticate each of the nodes and to provide access control. The multi-master directory provides access controls on a per object and per attribute basis. The event server creates a group session key for establishing one of the multicast groups and distributes the group session key in an encrypted message to the subscribers. The encrypted message encapsulates the group session key according to a prescribed format. The event server updates the group session key by utilizing a change password protocol to modify an object in the directory. The event server notifies the subscribers to reregister in response to the updating of the group session key. Such an arrangement enables scalable, secure multicast group communication.

In yet another aspect of the invention, a computer system for establishing multiple secure multicast groups comprises a communication interface for communicating with a plurality of principals and for interfacing a multi-master directory to authenticate the computer system and the plurality of principals. The multi-master directory has access controls on a per object and per attribute basis, wherein the principals access the directory to determine events that they may process. A bus is coupled to the communication interface for transferring data. One or more processors is coupled to the bus for selectively generating a group session key and private keys corresponding to the plurality of principals. The group session key is updated by utilizing a change password protocol to modify an object corresponding to the events in the directory. A memory is coupled to the one or more processors via the bus. The memory includes one or more sequences of instructions which when executed by the one or more processors cause the one or more processors to perform the steps of registering the plurality of principals, determining whether the principals are authorized to produce and authorized to receive certain events corresponding to objects of the directory, distributing the group session key to the principals via a message and selectively reregistering the principals in response to updating the group session key. The message encapsulates the group session key according to a prescribed format. The above computer system provides a scalable network of event servers for creating multicast secure communication channels.

By integrating a replicated multi-master directory with per object and per attribute access controls, the invention provides scalability on a level that otherwise cannot be achieved. A multicast mechanism for key update is provided. Authentication can be provided by any scalable mechanism that is integrated with the access control mechanisms and prevents replays using time synchronization, e.g., Kerberos V5. Subscribers and producers may concurrently belong to many groups. Scalability is further enhanced by limiting state on a network entity to be proportional to the number of groups the entity belongs to. Each event type is represented by an object in the directory.

BRIEF DESCRIPTION OF THE DRAWINGS

Embodiments are illustrated by way of example, and not by way of limitation, in the figures of the accompanying drawings in which like reference numerals refer to similar elements and in which.

DETAILED DESCRIPTION OF THE PREFERRED EMBODIMENT

Figure 1:
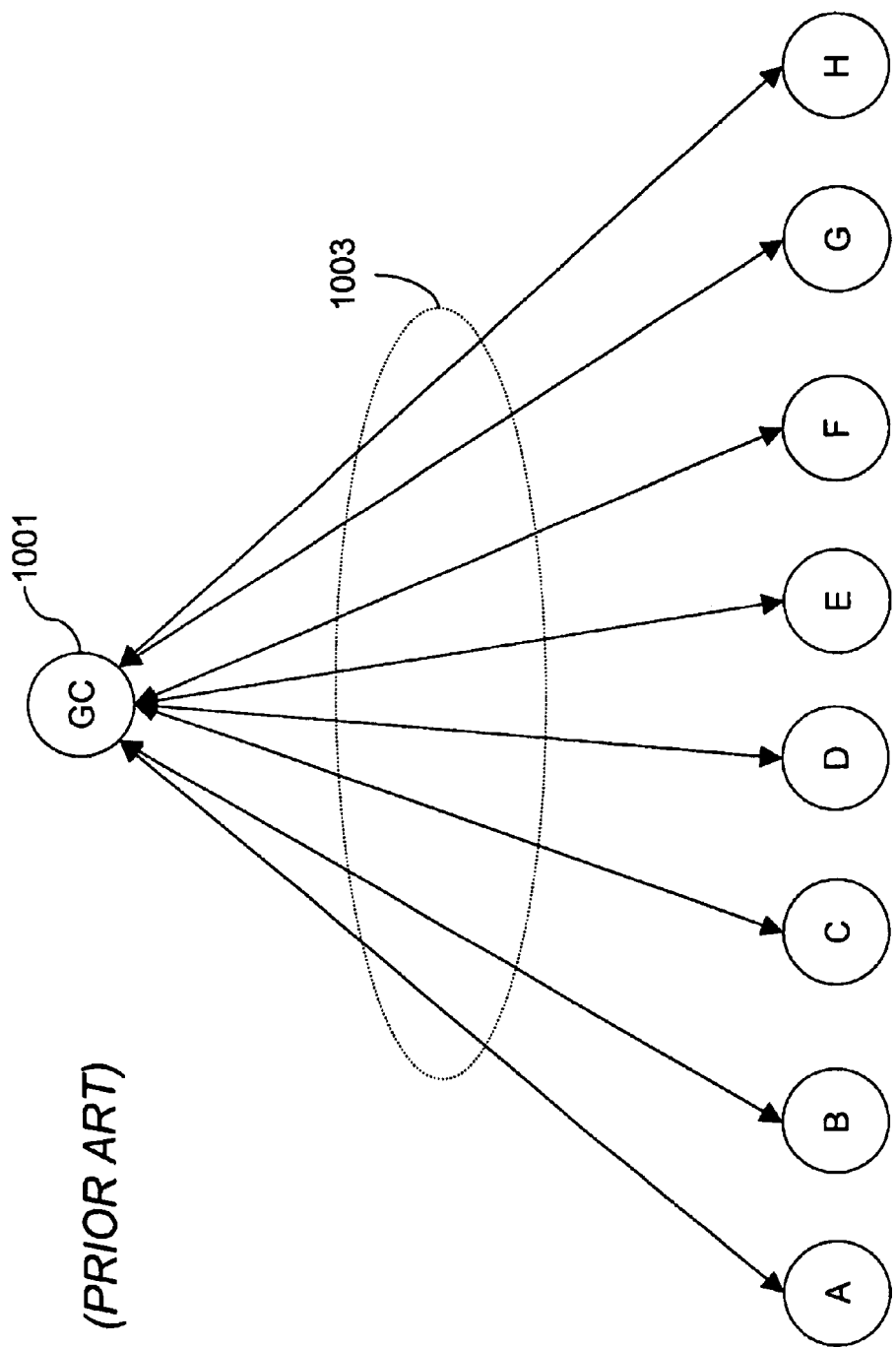
FIG. 1 is a diagram of a conventional secure communication system using a single centralized group controller.

In the following description, for the purposes of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention.
Structural Overview Generally, this document describes an invention for achieving scaleable secure communication within multiple multicast groups. The group sizes are limited only by the underlying multicast networking infrastructure. Events are loosely defined as multicasted messages. Producers are network entities that send events to subscribers who receive events.

Advantageously, the invention provides integration with a replicated multi-master directory with per object and per attribute access controls. This integration allows for scalability on a level that would otherwise not be achievable. To obtain further performance benefits as well as maintaining thin clients, an event server, implemented as a server process, is co-located with each directory process, and there may be additional event servers running on separate hosts. A multicast mechanism for key update is provided.

Authentication can be provided by any scaleable mechanism that also is integrated with the access control mechanisms and prevents replays using time synchronization. One protocol that provides this functionality is Kerberos V5. Public key infrastructure can be leveraged to allow authentication from beyond the directory tree; thus groups can include subscribers that are not represented by objects in the directory tree (e.g., using public key Kerberos). This invention makes use of a standard security interface such as GSSAPI, which reduces the amount of implementation work.

Subscribers and producers can belong to many groups simultaneously. Scalability is further enhanced by limiting state on a network entity to be proportional to the number of groups the entity belongs to. Thus performance sensitive devices like network servers and routers can participate in numerous multicast security groups without concern for the size of these groups. This contrasts with many existing multicast approaches where entity state is proportional to the size of the multicast group. Each event type is represented by an object in the directory; for ease of implementation, the event type object is a directory principal, i.e., an entity with a cryptographic identity.

One approach for creating multiple secured multicast groups is devised using a distributed system that employs a directory to disseminate and update group session keys. To establish a secured channel among the participating multicast group members, a group controller approach is used. The group controller is implemented as an event server that manages public and private keys for all the subscribers and publishers. An event server is a type of server process. The event server is integrated with a multi-master directory, thereby promoting scalability.

Embodiments may be used in improved public key encryption. In basic public key encryption, a group of participants publish their public keys, for example, in a database, and maintain their own private keys. These participants can access the database to retrieve the public key of the participant to whom they want to send a message and use it to encrypt a message destined for that participant.

Figure 2:
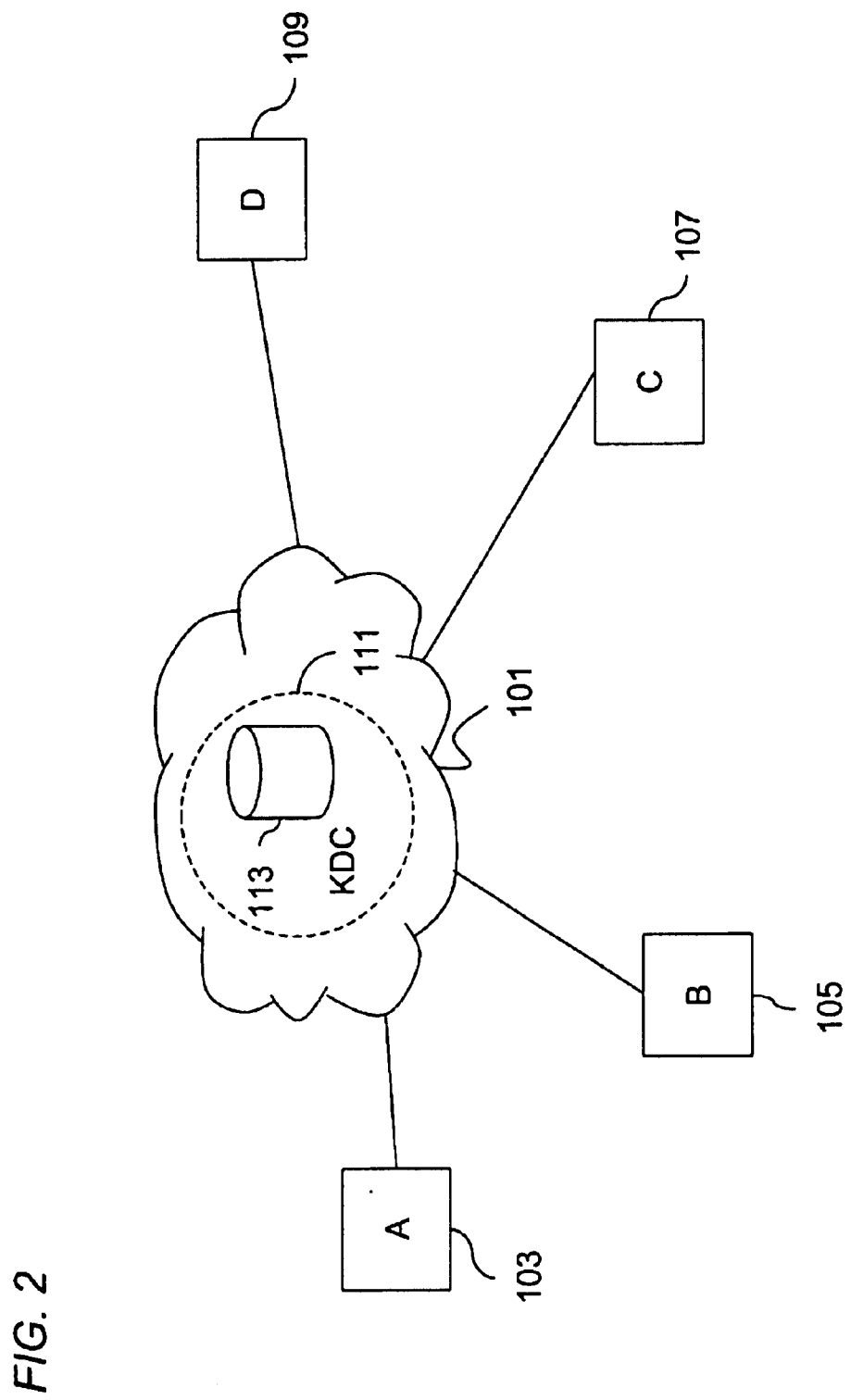
FIG. 2 is a block diagram of a secure communication system employing a key distribution center (KDC) in accord with one embodiment of the present invention.

Unfortunately, the database, even if secure, is vulnerable to key substitution during transmission of the keys. This problem is alleviated by using an trusted intermediary, called a Key Distribution Center (KDC) or a group controller, which is responsible for distributing the stored secret keys to the multicast or broadcast group members. The KDC accomplishes this task by encrypting the secret keys with keys protected by the respective entity secret keys. The group members then decipher the encrypted message to determine the shared group secret key.
Directory Integration FIG. 2 shows an exemplary KDC (or group controller) implementation with four users A, B, C, D connected in network 101. The network 101 may be a packet switched network that uses Internet Protocol (IP). The IP standard is documented in Request For Comments (RFC) 791, which is hereby incorporated by reference in its entirety as if fully set forth herein. In this example, workstations 103, 105, 107, 109 of users A, B, C, D, respectively, constitute members of a multicast group.

KDC 111 establishes point-to-point communication with the workstations 103, 105, 107, 109 to authenticate the members. Workstations 103, 105, 107, 109 obtain dynamic session keys from the KDC 111 for subsequent secure communication among themselves. In this case, KDC 111 generated the session key. Alternatively, one of the nodes 103, 105, 107, 109, which initiates communication with the multicast group, may generate and supply a dynamic group key based on a symmetrical cryptographic algorithm to the KDC 111.

Other nodes seeking to participate in the secure communication may do so by requesting the group session key from the KDC 111, which distributes it using secured point-to-point communication. For purposes of illustration, assume that user A desires to publish a message to the other users B, C, D. As a publisher, user A sends the authenticated event to an event server (using the format of the message in FIG. 5B), which then uses the group session key to authenticate and protect the multicast transmission to parties B, C, and D. It should be noted that if user A is trusted by the other users B, C, D, user A can itself assume the role of a KDC.

If each of the members of the multicast group can be either a publisher or a subscriber, then an individual group member can employ different group session keys when it publishes a message. In this manner, the particular session keys associated with the group members can serve as authentication signatures or certificates. In an exemplary embodiment, the group members initially authenticate themselves by using a certificate authority (CA) or a Kerberos KDC, in which case the session keys need not serve as an authentication signature/certificate. Kerberos is a known key based authentication service.

In the preferred embodiment, a multi-master directory with per object and per attribute access controls is employed. The directory can provide Kerberos service under control of any of a number of operating systems (e.g., Windows, UNIX, etc.). In general, the public key infrastructure provided by the directory can allow authentication from beyond the directory tree. Thus, multicast groups can include nodes that are not represented by objects in the directory tree. Authentication can be provided by any other scaleable mechanism that is integrated with the access control mechanisms and prevents replays using time synchronization.

In one embodiment, KDC subnetwork 111 is a distributed and near-statically replicated directory, which provides the services of the KDC. In general, directory technology creates active associations among the users, applications, and the network.

A directory is a logically centralized, highly distributed data repository, which can be accessed by the applications. The distributed nature of directories is achieved by replicating data across multiple directory servers, which are strategically located throughout the network, in part, based upon traffic engineering considerations. Directories can represent network elements, services, and policies to enable ease of network administration and security. In particular, a directory can supply authentication services, whereby all users, applications, and network devices can authenticate themselves through a common scheme. A directory server can be implemented as a distributed, replicated, object database, in which one or more master copies of the database is maintained along with a number of replicas. In the preferred embodiment, the directory is a multi-master directory.

One type of directory within contemplation of the present invention is Active Directory, which is an open and standards based directory developed by Microsoft Corporation. Active Directory is a Directory-Enabled Networks (DEN) compliant, Lightweight Directory Access Protocol (LDAP)-based directory. LDAP is a directory standard that is based upon the ITU (International Telecommunications Union) X.500 standard. LDAP provides client PCs access to X.500 directory servers over a TCP/IP (Transmission Control Protocol/Internet Protocol) based network. The details of LDAP are set forth in RFC 1777, which is hereby incorporated by reference in its entirety as if fully set forth herein. X.500 employs a distributed approach by realizing that information is maintained locally in Directory System Agents (DSAs).

Referring again to FIG. 2, a directory may contain user account or security principal information for authenticating users or services along with the shared secret key between the members A, B, C, D and the directory. The directory information may be stored in a database 113, which can reside within each KDC or shared among two or more KDCs. Users A, B, C, D authenticate themselves using the security services of the directory. Further, the directories can serve as CAs, or work cooperatively with CAs. The secured channels within KDC subnetwork 111 can be established using any suitable key exchange method.

Figure 6A:
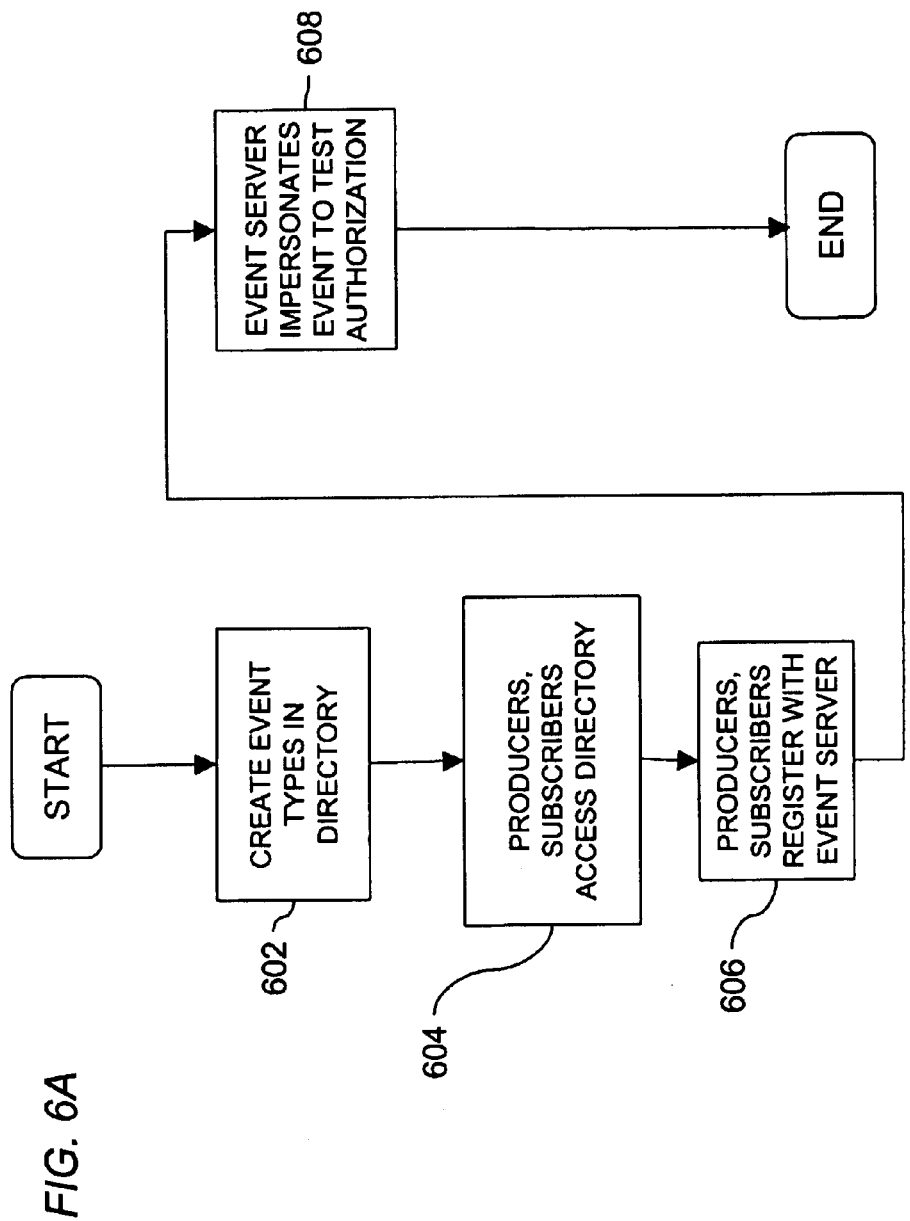
FIG. 6A and FIG. 6B are flow diagrams of event processing for publishers and subscribers.

FIG. 6A is a flow diagram of a method of using a system having this configuration. In block 602, an administrator creates event types in the directory. Each event type is represented by an object in the directory. These objects are also principals. The eventing infrastructure consists of the directory, the event service, the event producers, the event subscribers, and event types.

In block 604, producers and subscribers access the directory to find out what events they should process. In block 606, the producers and subscribers register with the event server to produce and/or subscribe to these events. In block 608, the event server impersonates such a request to see if the requester is authorized.

Thus, the access control mechanisms of the directory are leveraged. The distributed replicated nature of the directory allows this lookup process to scale.

Creating Secure Channels

Figure 3:
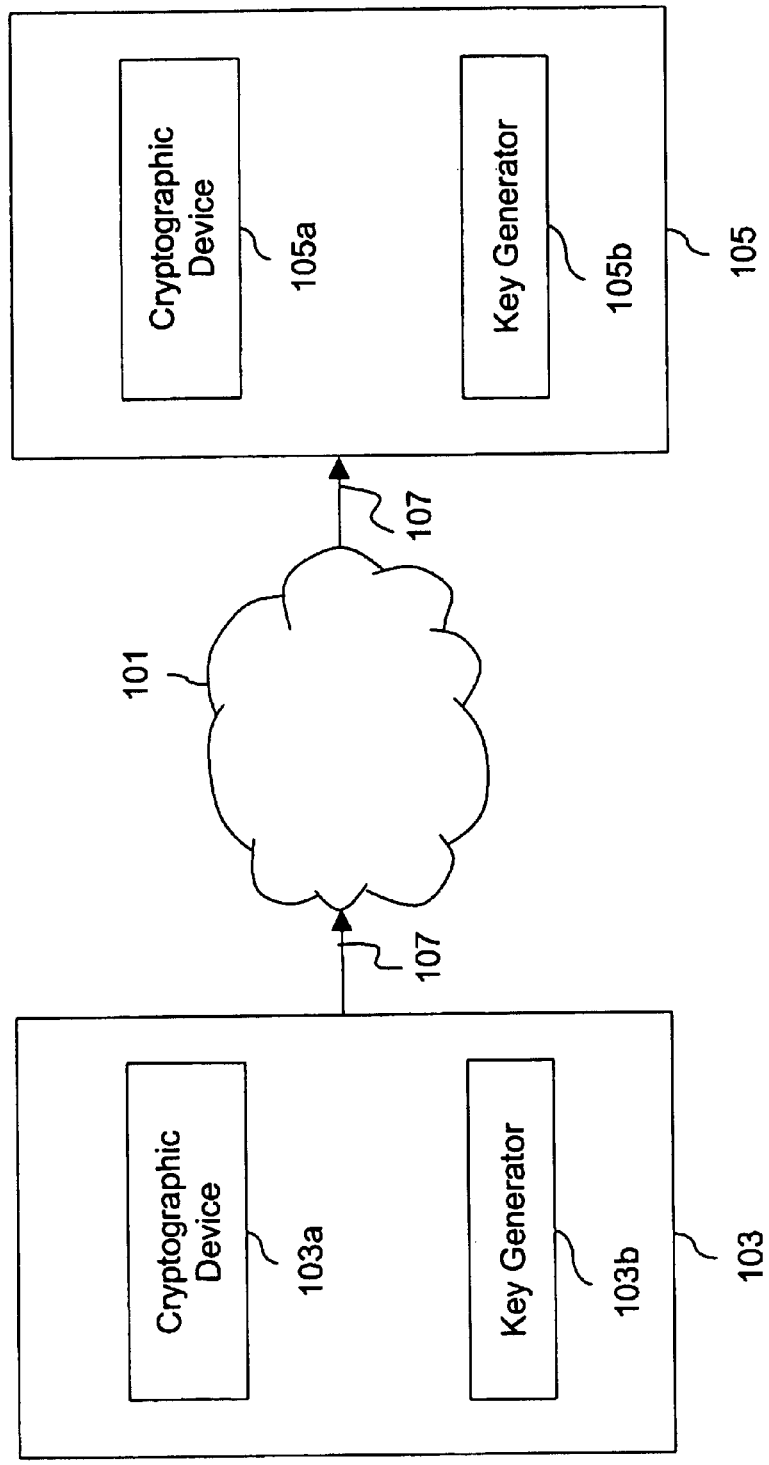
FIG. 3 is a block diagram illustrating the security mechanisms for providing secure communication between two participants in the system of FIG. 2.

FIG. 3 illustrates a secured communication system 201 that provides a secure channel between two participants, according to an embodiment of the present invention. A first participant, also referred to as user A, employs workstation 103 to communicate with workstation 105 of user B over a link 107. Link 107 is established over the network 101. The network 101 may be a LAN, a WAN, the global packet-switched network known as the Internet, a wireless transmission medium, or any other medium for exchanging information between the participants. In addition, link 107 may be non-secure, thereby allowing third party access to information transmitted by the link 107. Alternatively, link 107 may be secure.

The workstations 103, 105 of FIG. 3 have components with complementary functions. Workstation 103 of user A includes a key generator 103b and a cryptographic device 103a. Key generator 103b generates public and private keys used for encrypting and decrypting information exchanged with workstation 105 of user B. Cryptographic device 103a encrypts and decrypts information exchanged with workstation 105 using private and public keys generated by key generator 103b. Similarly, workstation 105 includes a key generator 105b and a cryptographic device 105a. Key generator 105b supplies public and private keys that are used to establish a secured link 107 with workstation 103. Information that are exchanged with workstation 103 are encrypted and decrypted by cryptographic device 105a using private and public keys generated by key generator 105*b*. Participants 103, 105, according to an embodiment of the present invention, can use a secret key Kerberos approach or can utilize various key exchange protocols, such as the Diffie-Hellman public key exchange approach, to exchange their keys. Using this approach, participants 103, 105 can securely exchange information over link 107 using a public key exchange protocol. An eavesdropper, having access to ciphertext transmitted on link 107, cannot feasibly decrypt the encrypted information. A known public key exchange method is the Diffie-Hellman method described in U.S. Pat. No. 4,200,770.

Event Service Node

Figure 4:
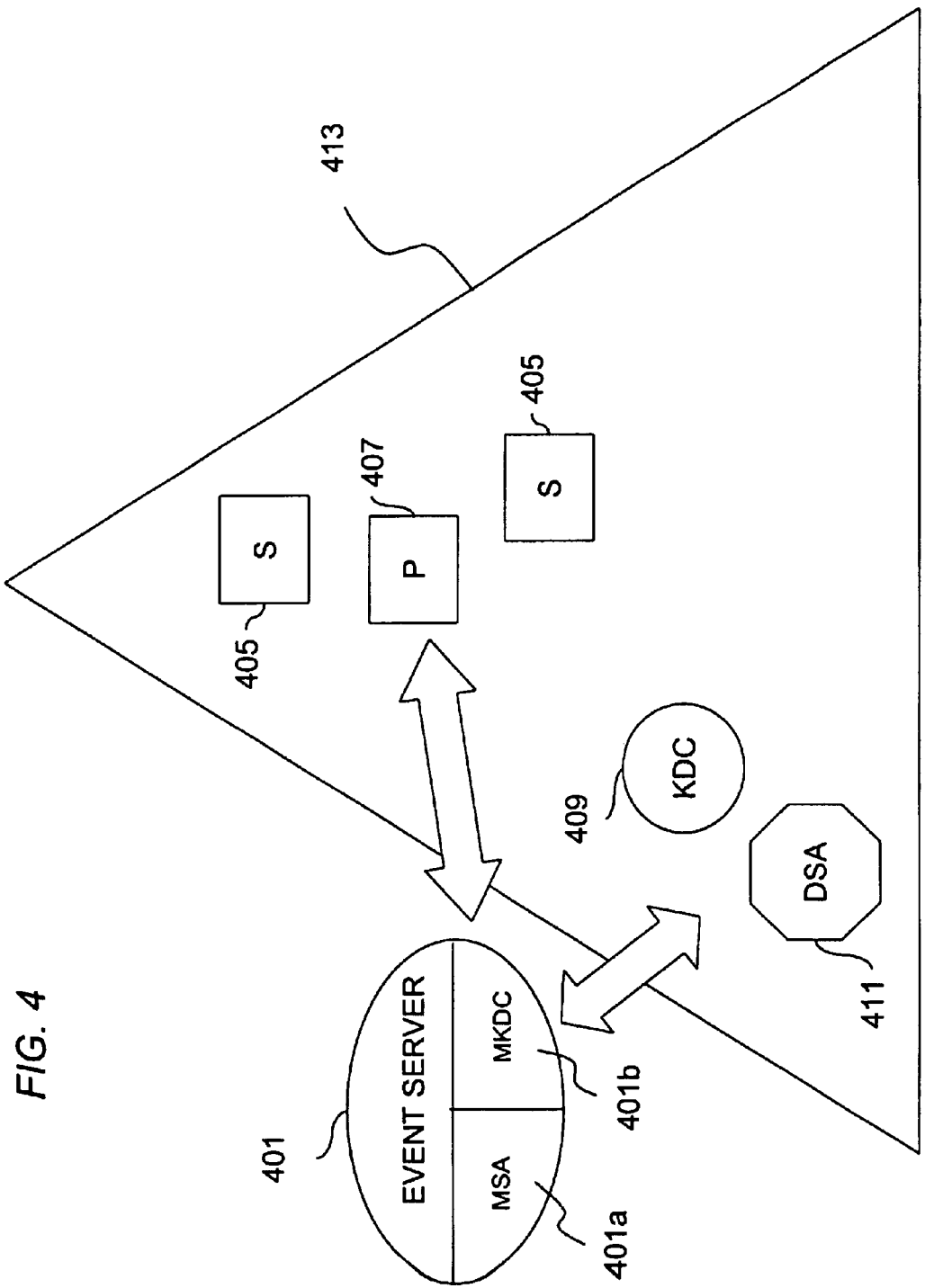
FIG. 4 is block diagram of a secure network utilizing a group controller according to an embodiment of the present invention.

FIG. 4 shows an event server that can cooperate with directory services to create secure channels among multicast groups.

An event service node 401 enables directory principals such as users, applications, and network devices to store event types as objects in the directory. A network administrator can create these event types. In one embodiment, an event type object corresponds to a directory principal such as an entity with a cryptographic identity. The term principal, used herein, is defined as a user, service, or computer that is a part of an unprotected network. An event object includes the following attributes: event metadata, group key, old group key. Event metadata includes information specific to the particular event type. The group key is the current multicast group session key, and the old group key is the previous multicast group session key for the event.

When events occur, they are queued in specific event queues. Other nodes or processes, called subscribers or consumers, may register to receive notification of such events. Event service node 401 includes a multicast service agent (MSA) 401*a* and can be distributed across LANs and WANs, and across their directory domains and trees. The distribution can be at all levels, including within a domain, among different domains, within or among trees, etc.

As an example, FIG. 4 illustrates interaction between one event service node 401 with various entities within a domain 413. As an illustration, the domain 413 has at least one directory system agent (DSA) 411 and an associated KDC 409. Also within domain 413 are a publisher 407 and two subscribers 405. DSA 411, in one implementation, is a database in which information is stored in accordance with the X.500 standard. Information is exchanged with other DSAs using the Directory System Protocol (DSP). The information is stored as entries to an object class, whereby the actual information in an entry is called "attributes." The object class defines the types of attributes an entry may possess.

The event service node 401, which can be implemented as an event server, manages keys for all of the event type principals. Publisher 407 and subscribers 405 communicate with event service node 401 through MSA 401 *a* to authenticate themselves, to discover what events they can publish or subscribe, and to obtain a group session key.

Publisher 407 and subscriber 405 register with the event service node 401 to produce or subscribe to these events. For producers, the event server checks the event type objects, using impersonation, to determine whether a producer is allowed to produce a particular event. Both producers and subscribers can obtain the events they should register for from the directory. The subscriber registration is also access checked by the event server. Subscribers 405 through a Directory User Agent (DUA) (not shown) can access the directory.

Figure 5A:
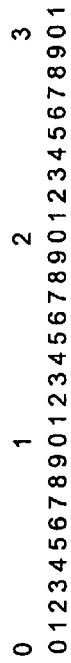
FIG. 5A, FIG. 5B, FIG. 5C are diagrams of header formats of different messages utilized by subscribers and publishers for communicating in accordance with an embodiment of the present invention.

As part of the registration process, subscribers 405 may receive a group key. In a preferred embodiment, the group key is protected in an encrypted message. FIG. 5A is a block diagram of the format of an exemplary message that may be used to respond to a request to register for a group key. The format and contents of fields in the message of FIG. 5A are described further below. FIG. 5B is a block diagram of an exemplary format of an event message that is used when a producer is producing an event. The format and contents of fields of FIG. 5B are described further in this document. To produce an event, publisher 407 creates one or more messages according the message format of FIG. 5B. For example, publisher 407 creates an initialize token and a wrap token, which grants the bearer permission to access an object or service, targeted at the event service node 401. In one specific embodiment, the initialize token is an InitializeSecurityContext token. The target principal is the event object principal. The event service node 401 wraps the event, or message, in a Kerberos wrap token and then creates a new event message in the format of FIG. 5B with the unencapsulated event from the producer event message. The event service node 401 can then multicast the message to the subscribers 405.

If the subscriber's key version does not match the message, the subscriber must re-register with the event server to ensure that the subscriber has the right key.

To authenticate publisher 407 and subscribers 405, event service node 401 uses the DSA 411 and the KDC 409. The publisher 407, subscribers 405, and event service node 401 are security principals with respect to DSA 411. Thus, publisher 407, subscriber 405, and event service node 401 can log into the system by supplying their credentials.

Event service node 401 creates a group session key that is specific to an event type. As a result, when the information is replicated across the network, local copies of the directory can be used to obtain a common group session key.

To ensure continued secured communication, it is desirable to change the group session keys periodically. MSA 401*a*, which is specific to publisher 407, generates a sufficient number of keys to be able to cycle through numerous group session keys to prevent an unauthorized user from intercepting and using these keys. If at any time the subscriber's key version does not match with the received message, the subscriber 405 must reregister with the event service node 401.

Key Updates

Key updates are vital to maintain the secure nature of the communication. In general, each event type has a corresponding master event service node 401. The master event service node 401 can be obtained, for example, from a domain name server resource record and can be changed through administrative action. The master event server can update the group session keys in response to normal expiration or other causes.

Figure 6B:
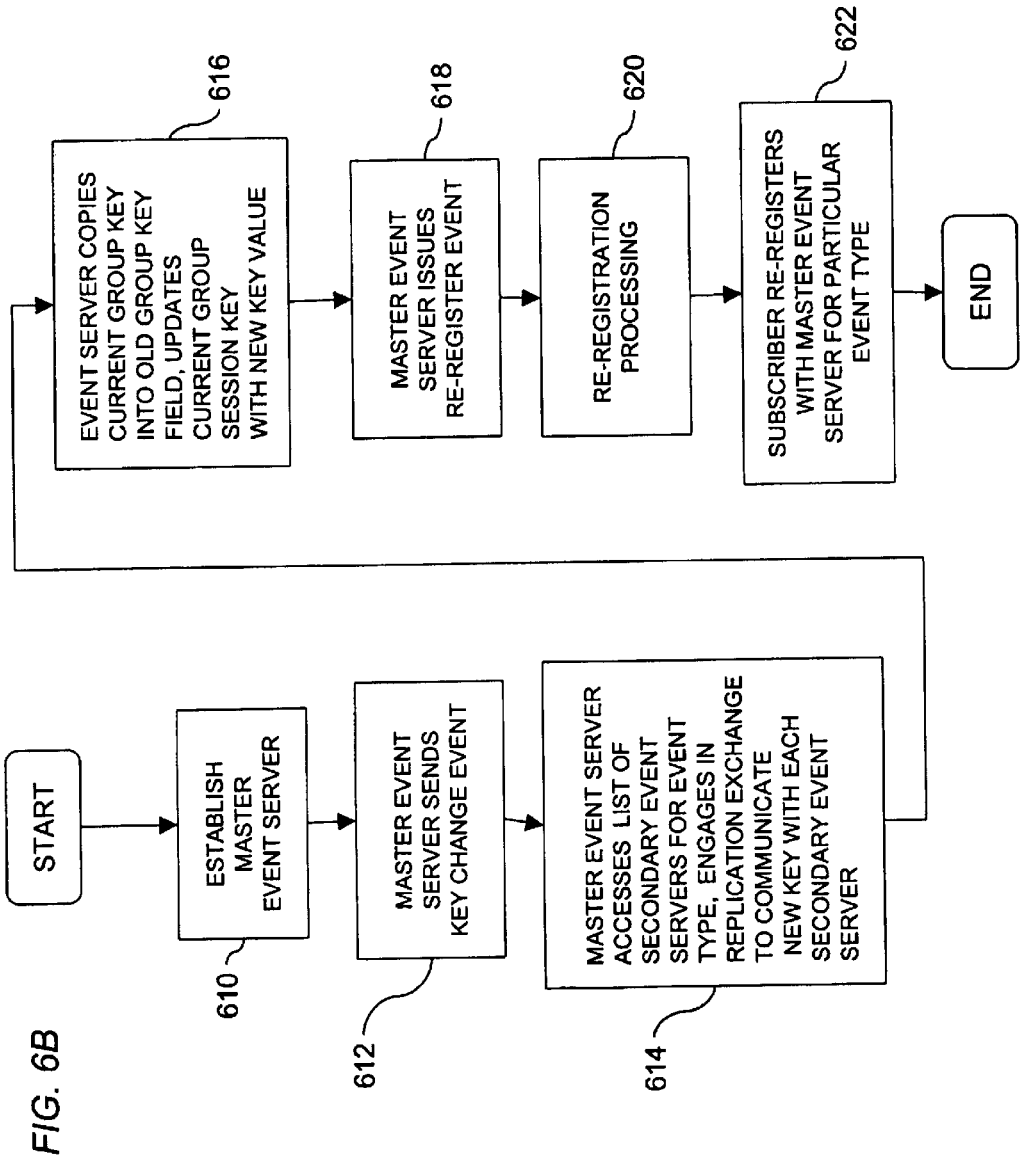

FIG. 6B is a flow diagram of a key update process that may be used in an exemplary embodiment.

In block 610, for each event type, a master event server is established or identified. For example, the identity of the master event server can be obtained from a DNS SRV resource record. It can be changed through administrative action. The master event server is responsible for updating keys either due to normal expiration, or due to other causes. Other causes result in events that are sent to the master event server.

In one embodiment, all the event servers are co-located with directory servers. Therefore, both event servers and directory servers form a multicast group. The event publisher or producer in such a group is the master event server for each of the different event types.

In block 612, a master event server sends a key change event. When a master event server 401 sends a key change event, it multicasts it to the rest of the group after setting the new key into the event type object and executing a change password protocol. The master event server preserves its state through the change operation.

In block 614, the master event server accesses a list of secondary event servers for the given event type, and engages in a point to point replication exchange, to communicate the new key, with each secondary event server. In one specific embodiment of the point to point replication exchange, the master notifies a secondary event server using a Notify message and then waits for the secondary event server to contact it. The master then sends the registration for group key message to the secondary event server. The secondary event server acknowledges receipt of the key with an Acknowledge message. The master event server will not send the Re-register event that is described below before it successfully receives acknowledgement from at least one secondary event server.

Initially, the old group key field of the event object type is empty. Upon receiving the multicast key update message, event server 401 copies the current group key into the old group key field and updates the current group session key with the new key value, as indicated in block 616. A principal that registers during this period will receive both the old group session key and the new group key. Accordingly, the event server 401 uses the change password protocol to update the new group key in the event principal object in the directory.

The master event server 401 next produces an event to subscribers 405 indicating that they should reregister, as shown by block 618, using a separate re-registration process. A subscriber that has been locked out will fail the re-registration process. The reregister message preferably has the format shown in FIG. 5C. In this configuration, the reregister message includes a Protocol Version Number field, Message Type field, Message Length field, Initialize Token field, Wrap Token Length field, and an Interval Period field. The interval period value represents a random interval to pick a time to re-register. Depending on the topology, the value could be zero (i.e., re-register immediately). Subscribers 405 reregister at the event server 401 that is physically or logically closest to them.

In block 620, special re-registration processing is carried out. A subscriber 405 could receive an event message with an advanced key version indicating that it needs to reregister. A subscriber 405 also could reregister with an event server 401 that has not received the key update, in which case subscriber 405 reregisters with the master event server 401 for that particular event type. In the latter case, the subscriber re-registers with the master event server for the particular event type, as indicated by block 622. If this re-registration fails, subscriber 405 attempts to reregister with another event server, as indicated by block 324, and a failure then normally results only if the master event server 401 is down. For some event types, subscribers 405 must be prevented from producing events. This is accomplished using digital signatures that are created by the master event server 401 for each event requiring such a feature.

The example architecture of FIG. 4 shows a single domain that is served by one event service node 401. However, in a complex network, each event service node may span thousands of domains, posing difficulty in directory replication. One approach is to cause subscribers 405, which may reside in any number of domains different from the publisher, to request group membership from the KDC in the publisher's domain.

Another problem concerns the control of membership joins. Specifically, simultaneous requests to join require some method of arbitration to prioritize the multiple requests. One approach is to require a random wait period after a first request attempt, for example, using an exponential back-off mechanism.

In the alternative, priority can be granted based upon a Time-To-Live (TTL) parameter, a field in an IP frame (not shown). The TTL parameter is used in the ring beacon protocol for priority determination. This protocol permits initially only neighboring nodes nearest the multicast group to join, and thereafter, allowing more distant nodes to become members of the multicast group. The TTL field is a numeric field whereby a large number corresponds to a node that is far away from the multicast group. Effectively, the TTL field limits the radius of hops (i.e., "search ring") of the multicast packet. In the context of membership joins, preference is given to close neighboring users before potential members who are more remote.

Under this expanding ring beacon protocol, when a new node joins the multicast group, the new node listens for a "beacon" from a neighboring node until it times out. Before timing out, if a beacon is detected, the neighboring node is admitted to the multicast group. The beacon contains an ordinal list of members of a group, which is identified by a value that is a hashed value of all the members' IP addresses. If a multicast node times out, it starts a group by itself (identified by a hashed value of its IP address) and expands the search ring by increasing its TTL value.

Message Formats

FIG. 5A and FIG. 5B are exemplary formats of messages that are exchanged among subscribers and publishers.

FIG. 5A is a block diagram of a format of a message that may be sent as part of the registration process by event server 401 to its subscribers. A Protocol Version field a two octet field indicating the version of the protocol that the subscriber 405 is utilizing to receive the message. The Message Type field stores a value that can define different types of registration messages. A Multiple Key Flag field enables the receiving group member to participate in multiple multicast groups. When set to "1", the key flag field indicates that optional Key Type, Key Length, and Key Value fields are present, thereby permitting the storage of additional key values.

Each Key Value field is associated with a Key Type and Key Length field. The Key Type field identifies the particular cryptographic algorithm used with the key. In the preferred embodiment, each message is encrypted in a Generic Security Service (GSS) wrap token in compliance with RFC 1964, which defines the Kerberos Version 5 GSS-API Mechanism. RFC 1964 defines a token as a cryptographically protected bit-string. The registration message of FIG. 5A permits subscribers to participate in many multicast groups to receive various events and messages from more than one publishers.

To produce an event, publisher 407 communicates with event server 401 using a message having the format shown in FIG. 5B. As with the format of FIG. 5A, the message includes a Protocol Version value and a Message Type value. The event message format further includes Message Length Field that specifies the number of bits the message occupies. The Wrap Token Length field and accompanying wrap token field each occupies two octets.

To ensure forward compatibility, in the preferred embodiment subscribers 405 can receive and process messages that have a message length that indicates the presence of fields that exist after the wrap token field. The subscriber will check that the client in the event message request is the event server.

Figure 5C:
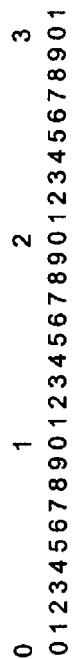
Figure 5B:
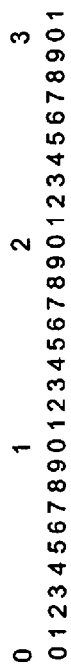

FIG. 5C shows the format of a reregister message. The reregister message includes each of the fields shown in FIG. 5B with the exception of the Initialized Token field. The reregister message comprises a Protocol Version field, a Message Type field, a Message Length field, and a four byte Interval Period field. The Interval Field value specifies a random duration for a group member to attempt to reregister. The default of this interval field is 0, indicating that the group member should immediately reregister.

Intergration of Multi-Master Directory

Figure 7:
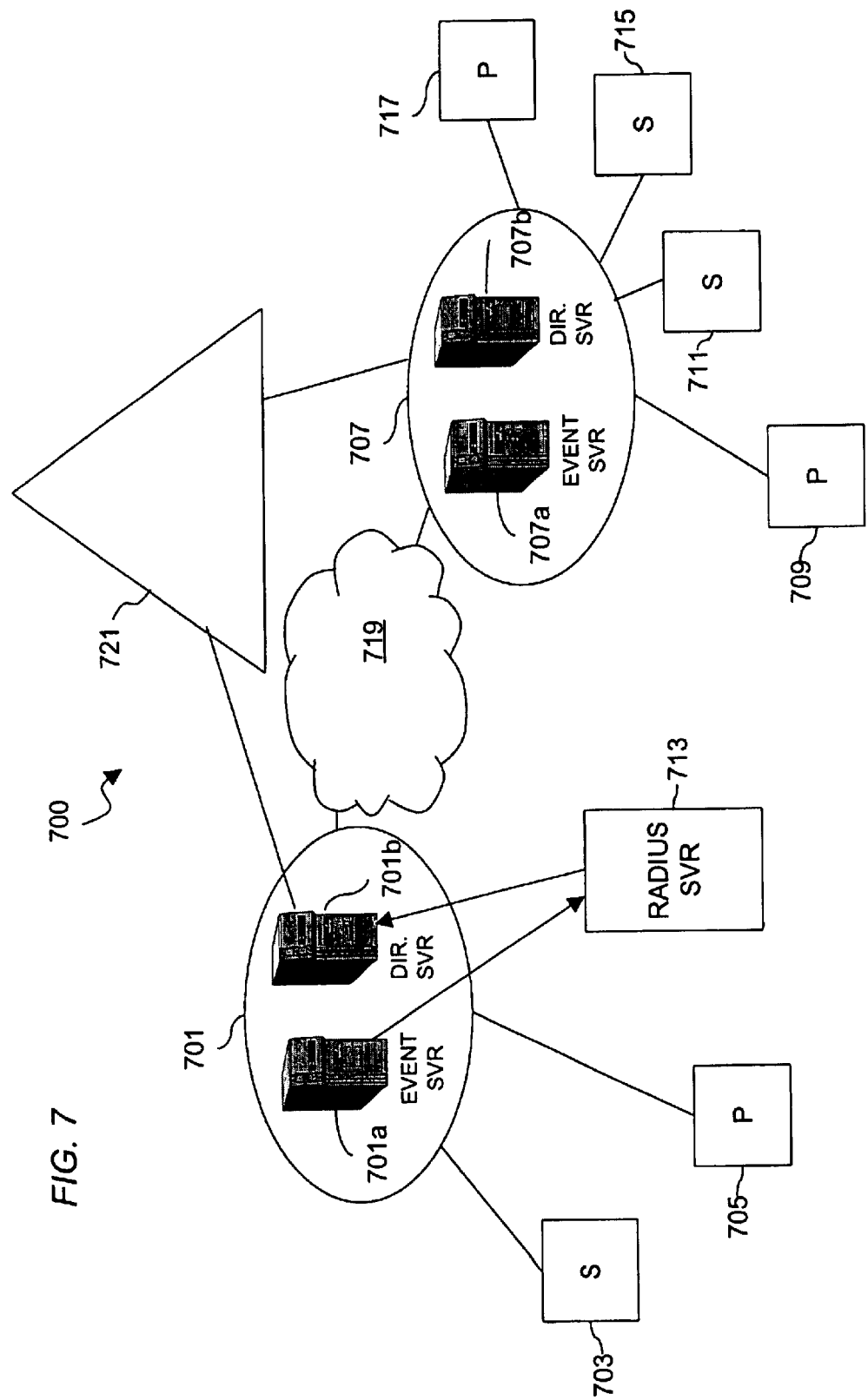
FIG. 7 is a block diagram of a network of event servers communicating utilizing directory services to establish secure multicast groups in accordance with an embodiment of the present invention.

FIG. 7 represents a network that integrates a multi-master directory with event servers to establish secure multicast groups of subscribers and publishers.

Event service node 701 comprises an event server 701a and a directory server 701b. Event service node 701 is in communication with subscriber 703 and publisher 705. The event server 701a and the directory server 701b are co-located and participate in the same multicast group.

A remote authentication dial-in user service (RADIUS) server 713 provides secure remote access to the network 700 and its services. The RADIUS server 713 houses user authentication and network service access information. The event server 701a supplies information to the RADIUS server 713. In turn, the RADIUS server 713 communicates with directory server 701b to notify the directory 721 that certain remote subscribers or publishers have been authenticated. Directory 721 stores objects that correspond to event types, which have been created by a network administrator. Event types are categorized according to the messages the publishers 705, 709 seek to publish.

In one embodiment, event servers 701a, 707a are master event servers. For each event type, there is a corresponding master event server 701a, 707a. In an exemplary embodiment, publishers 705, 709, 717 can assume the role of master event server. The master event server is responsible for updating the keys by sending a key change event to the multicast group. This update process is more fully discussed herein with respect to FIG. 8B.

Similarly, event service node 707 has an event server 707a communicating with directory server 707b. Directory servers 701b, 707b are part of directory 721. The event service nodes 701, 707 are linked via an IP network 719. Event service node 707 serves subscribers 711, 715 and publishers 709, 717. Assuming publishers 715, 717 each send event messages over separate multicast groups, the event service node 707 can accommodate subscribers 711, 715 participating in both multicast groups. One multicast group may involve subscribers 703, 711 and publisher 709, while another multicast group encompasses subscribers 711, 715 and publisher 717.

The network of FIG. 7 enhances scalability by limiting the state of a network entity to be proportional to the number of multicast groups the entity participates in. That is, the number of keys that require storage within the directory is limited. In this manner, performance sensitive network devices, such as servers and routers, can be a part of numerous multicast groups, irrespective of the size of the groups or the number of participants in the groups. In contrast, the network entity state, in conventional approaches, is disadvantageously proportional to the size of the multicast group.

Establishing a Secure Multicast Group

Figure 8A:
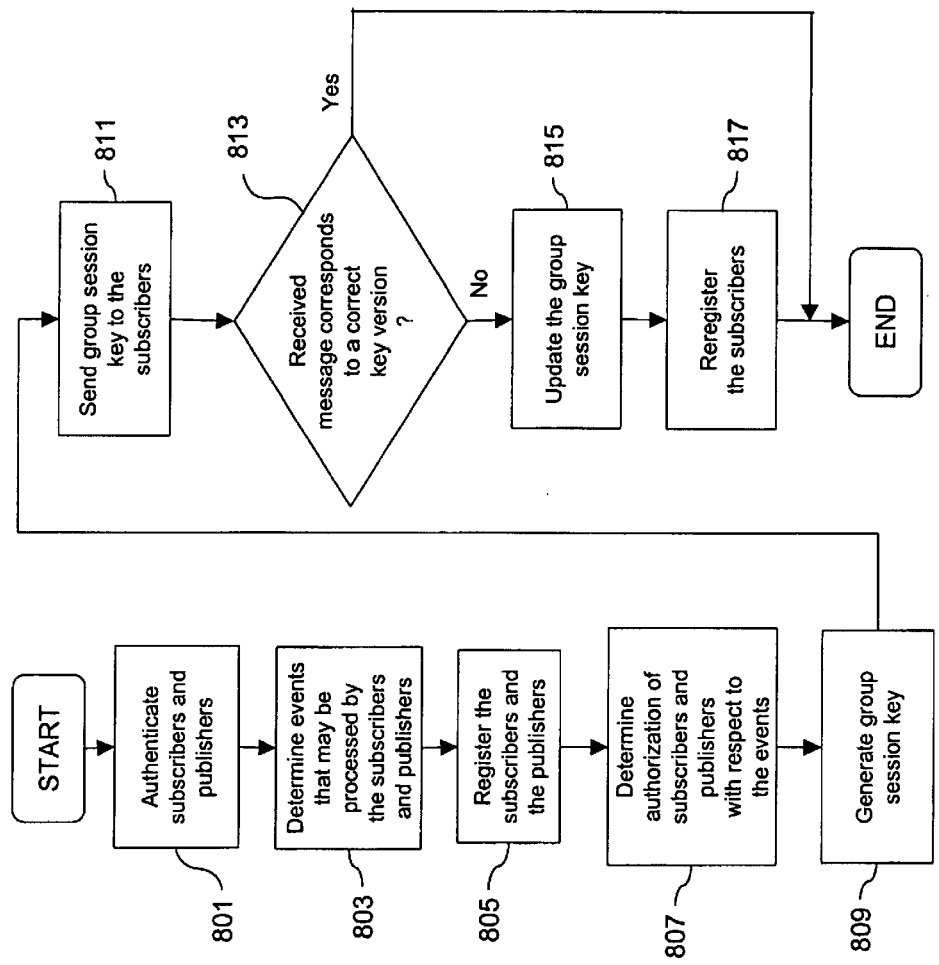
FIG. 8A and FIG. 8B are flow charts of establishing a secure multicast group and updating the associated group session key, respectively, according to embodiments of the present invention.

FIG. 8A is a flow diagram of a process of establishing a secure multicast group in the system of FIG. 7. For purposes of illustration, assume that publisher 709 has a message to multicast to subscribers 711, 715.

Publisher 709 and subscribers 711, 715 authenticate themselves to master event server 707a, as shown in step 801. Step 801 may involve, using, for example, a Kerberos server to authenticate the publisher and the subscribers.

In step 803, the potential multicast group members determine which events they should process by accessing the directory 721. Based upon this determination, the subscribers 711, 715 and publisher 709 individually register with the master event server 707a as shown in step 805. In step 807, the directory server 707b checks whether publisher 709 is authorized to send the event and whether the subscribers 711, 715 are authorized to receive it. For some event types, subscribers 711, 715 must be prevented from producing events. This can be accomplished by using digital signatures. The master event server 707a creates a digital signature private key in the directory for each such event that requires it. Other event servers possess read/write access to this key. Subscribers 711, 715 have read access to the corresponding verification key. An event message in the format of FIG. 5B is appended with optional fields that provide digital signature information, such as algorithm identifier, signature field, etc. The digital signature information allows the subscriber to validate that the event message has been produced by an authorized publisher.

If each principal is authorized, the event server 707a in conjunction with directory server 707b generates a group session key that is encapsulated in an LDAP message, as in step 809. The master event server 707a then distributes the message to the subscribers 711, 715, as shown in step 811. Upon receipt of the message, the subscribers 711, 715 check whether the group session key is the correct version, as shown by step 813. If the group session key is an incorrect version, the event service node 707, as in step 815, updates the key. Next, the event service node 707 instructs the subscribers 711, 715 to reregister, thereby updating the group session key.

Figure 8B:
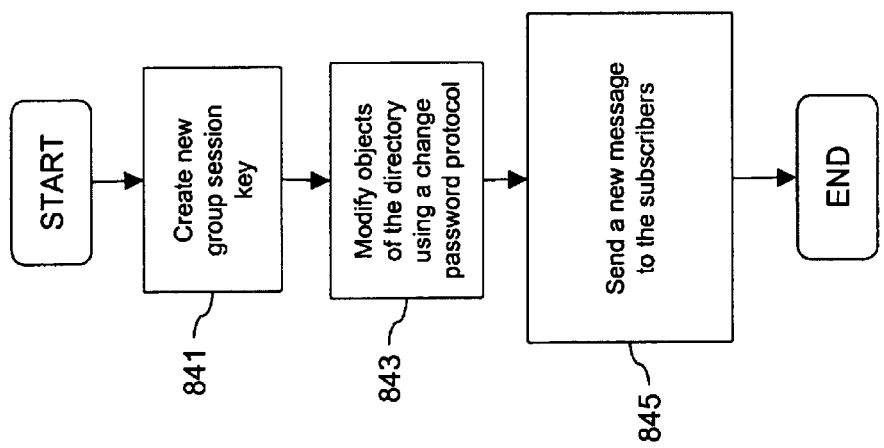

FIG. 8B illustrates a process of updating a group session key among a multicast group. As discussed above, the master event server 707a is charged with updating the keys. Updating of the group session key is critical so that security of the multicast group is not comprised. Updates may be necessitated because of normal expiration or group membership changes.

Continuing with the example of FIG. 8A, the event server 707a, which is designated as the master event server, recognizes that an updated group session key is required. As shown in step 841, event service node 707 creates a new group session key. In particular, the event server 707a produces the new group session key based upon a predetermined cryptographic algorithm and communicates this information to the directory server 707b. Accordingly, directory server 707b modifies a corresponding event object in the directory using a change password protocol, as shown in step 843. The master event server 707a preserves its state during this change operation.

The event object, in an exemplary embodiment, possesses an "old" group key field and a current group key field. The previous group session key is transferred to the old group key field, and the newly generated group key field occupies the current key field. The master event server 707a, according to step 845, sends a new message to the subscribers 711, 715, notifying the subscribers to reregister. Upon receiving this message, subscribers 711, 715 contact the event server that is most physically near them, such as event server 707a.

Under the above approach to key update, one of the subscribers 711, 715 may receive an event message with an advanced key version indicating that it needs to reregister. Also, one subscriber 711, 715 may reregister with an event server 707a that has not received the key update. This is possible, for instance, when the process of replicating the directory servers has not finished. In this case, the subscriber 711 or 715 should reregister with the master event server 707a for the particular event type. However, if the re-registration process fails, subscriber 711, 715 will proceed to a different event server 701a. The re-registration process could fail, for example, if the master event server 707a is down.

In the preferred embodiment, the elements and processes shown in FIGS. 1-8 may be implemented as one or more computer-executed instructions, processes, programs, subroutines, functions, or their equivalents. In an embodiment, each workstation 103, 105, 107, 109 is a general-purpose computer of the type shown in FIG. 9 and described herein in connection with FIGS. 3. The cryptographic devices 103a, 105a and the key generators 103b, 105b are one or more computer-executed instructions, processes, programs, subroutines, functions, or their equivalents. Further, embodiments may be implemented as discrete hardware circuitry, a plurality of computer instructions (computer software), or a combination of discrete hardware circuitry and computer instructions.

Hardware Overview

Figure 9:
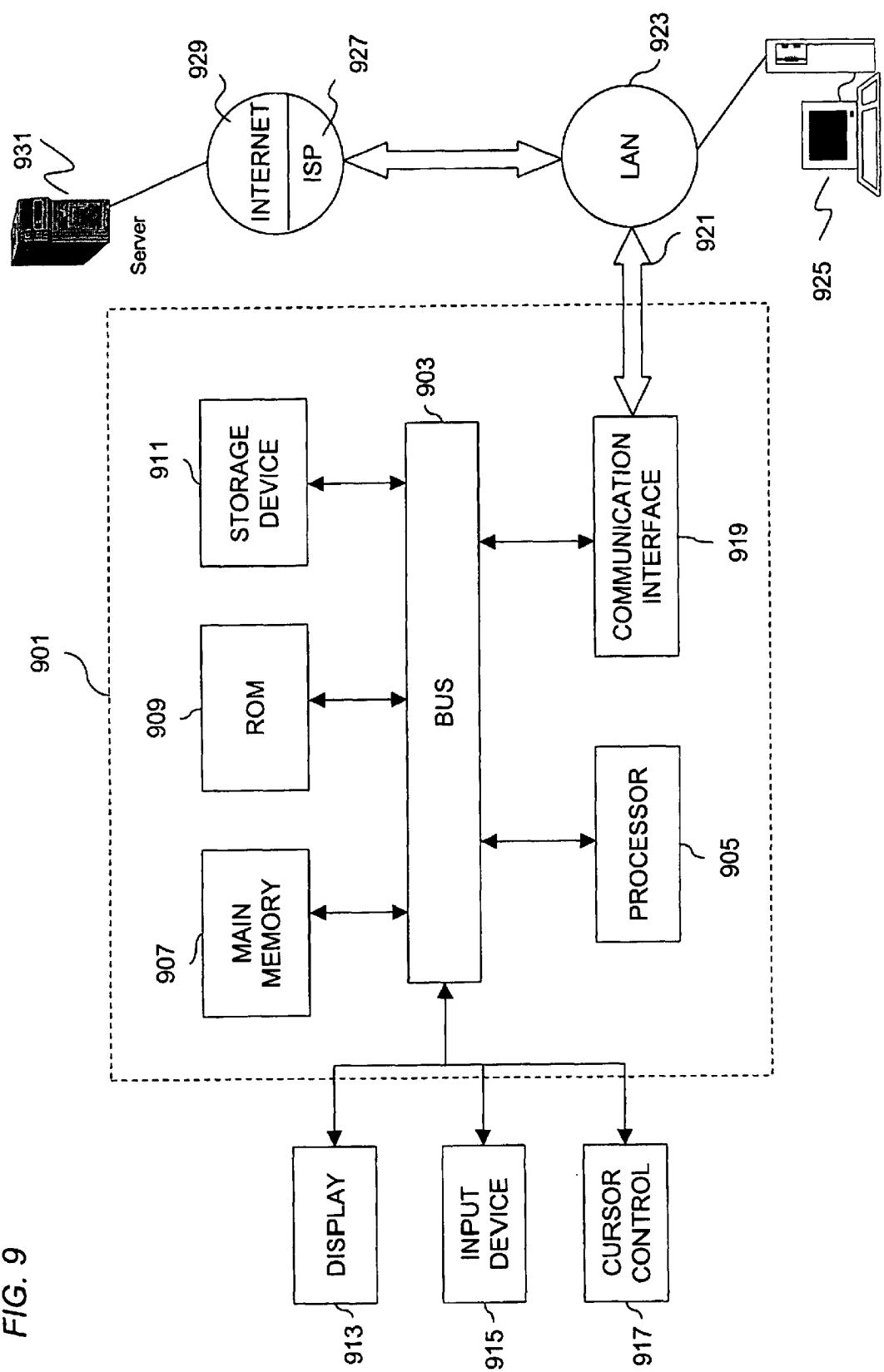
FIG. 9 is a block diagram of a computer system on which embodiments of the event service node may be implemented according to embodiments of the present invention.

FIG. 9 illustrates a computer system 901 upon which an embodiment according to the present invention may be implemented. Such a computer system 901 may be configured as a user node or server node to provide the various security and directory services as earlier discussed. Computer system 901 includes a bus 903 or other communication mechanism for communicating information, and a processor 905 coupled with bus 903 for processing the information. Computer system 901 also includes a main memory 907, such as a random access memory (RAM) or other dynamic storage device, coupled to bus 903 for storing information and instructions to be executed by processor 905. In addition, main memory 907 may be used for storing temporary variables or other intermediate information during execution of instructions to be executed by processor 905. Notably, the values associated with tracking the number of times a node engages in multicast group formation may be stored in main memory 907. Computer system 901 further includes a read only memory (ROM) 909 or other static storage device coupled to bus 903 for storing static information and instructions for processor 905. A storage device 911, such as a magnetic disk or optical disk, is provided and coupled to bus 903 for storing information and instructions.

Computer system 901 may be coupled via bus 903 to a display 913, such as a cathode ray tube (CRT), for displaying information to a computer user. An input device 915, including alphanumeric and other keys, is coupled to bus 903 for communicating information and command selections to processor 905. Another type of user input device is cursor control 917, such as a mouse, a trackball, or cursor direction keys for communicating direction information and command selections to processor 905 and for controlling cursor movement on display 913.

FIG. 5C shows the format of a reregister message. The reregister message shows each of the fields shown in FIG. 5B with the exception of the Wrap Token field. The reregister message comprises a Protocol Version field, a Message Type field, a Message Length field, an Initialize Token field, a Wrap Token Length field, and a four byte Interval Period field. The Interval Period value specifies a random duration for a group member to attempt to reregister. The default of the interval field is 0, indicating that the group member should immediately reregister.

The term "computer-readable medium" as used herein refers to any medium that participates in providing instructions to processor 905 for execution. Such a medium may take many forms, including but not limited to, non-volatile media, volatile media, and transmission media. Non-volatile media includes, for example, optical or magnetic disks, such as storage device 911. Volatile media includes dynamic memory, such as main memory 907. Transmission media includes coaxial cables, copper wire and fiber optics, including the wires that comprise bus 903. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 905 for execution. For example, the instructions may initially be carried on a magnetic disk of a remote computer. The remote computer can load the instructions relating to computation of the shared secret key into its dynamic memory and send the instructions over a telephone line using a modem. A modem local to computer system 901 can receive the data on the telephone line and use an infrared transmitter to convert the data to an infrared signal. An infrared detector coupled to bus 903 can receive the data carried in the infrared signal and place the data on bus 903. Bus 903 carries the data to main memory 907, from which processor 905 retrieves and executes the instructions. The instructions received by main memory 907 may optionally be stored on storage device 911 either before or after execution by processor 905.

Computer system 901 also includes a communication interface 919 coupled to bus 903. Communication interface 919 provides a two-way data communication coupling to a network link 921 that is connected to a local network 923. For example, communication interface 919 may be a network interface card to attach to any packet switched LAN. As another example, communication interface 919 may be an asymmetrical digital subscriber line (ADSL) card, an integrated services digital network (ISDN) card or a modem to provide a data communication connection to a corresponding type of telephone line. Wireless links may also be implemented. In any such implementation, communication interface 919 sends and receives electrical, electromagnetic or optical signals that carry digital data streams representing various types of information.

Network link 921 typically provides data communication through one or more networks to other data devices. For example, network link 921 may provide a connection through local network 923 to a host computer 925 or to data equipment operated by an Internet Service Provider (ISP) 927. ISP 927 in turn provides data communication services through the Internet 929. Local network 923 and Internet 929 both use electrical, electromagnetic or optical signals that carry digital data streams. The signals through the various networks and the signals on network link 921 and through communication interface 919, which carry the digital data to and from computer system 901, are exemplary forms of carrier waves transporting the information.

Computer system 901 can send messages and receive data, including program code, through the network(s), network link 921 and communication interface 919. In the Internet example, a server 931 might transmit a requested code for an application program through Internet 929, ISP 927, local network 923 and communication interface 919. One such downloaded application provides a public key exchange encryption approach for securely exchanging data between participants as described herein.

The received code may be executed by processor 905 as it is received, and/or stored in storage device 911, or other non-volatile storage for later execution. In this manner, computer system 901 may obtain application code in the form of a carrier wave.

The techniques described herein provide several advantages over prior public key exchange encryption approaches for securely exchanging data among multiple participants using directory replication. By utilizing the services of a multi-master directory, a secure communication system is created, which exhibits improved system throughput and scalability.

In the foregoing specification, particular embodiments have been described. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for securely establishing communication in a multicast group of nodes of a network, in which the network includes publisher nodes, subscriber nodes, a multi-master directory that stores information about events in the network and that can authenticate the subscriber nodes and the publisher nodes, wherein each of the subscriber nodes and the publisher nodes receives a unique private key and that can determine events that the subscribers and the publishers may process, the method comprising the steps of:

registering the subscribers and the publishers with an event server configured to determine whether the publishers are authorized to produce certain events corresponding to event types and whether the subscribers are authorized to receive the certain events in response to the step of registering; and generating, with the event server, a group session key for establishing the multicast group, the group session key being encrypted in a first message that has a prescribed format.

2. The method as recited in claim 1, further comprising the steps of:

receiving a second message from the subscribers in response to the subscribers determining whether the first message corresponds to a correct key version;

updating the group session key; and selectively reregistering the subscribers at the event server.

3. The method as recited in claim 1, wherein the prescribed format of the first message conforms with lightweight directory access protocol (LDAP).

4. The method as recited in claim 1, wherein the prescribed format of the first message comprises a protocol version number field, a message type field, and a message length field.

5. The method as recited in claim 1, wherein the directory authenticates by controlling access in conjunction with utilizing an external authentication service that allows extending membership of the multicast group to subscribers with no corresponding objects in the directory.

6. The method as recited in claim 5, wherein the external authentication service is supplied by a Kerberos server.

7. The method as recited in claim 1, wherein the event server manages the private keys of the subscribers and the publishers.

8. The method as recited in claim 2, wherein the step of updating comprises:

creating a new group session key;

modifying an object in the directory based upon the new group session key by using a change password protocol;

sending a new message that contains the new group session key to the subscribers; and notifying the subscribers to reregister.

9. The method as recited in claim 1, wherein the step of registering comprises performing access control check of the subscribers by the event server.

10. A communication system for creating a plurality of secure multicast groups in a network that includes a plurality of principals configured for functioning as subscribers and publishers, each of the principals having a private key, a multi-master directory comprising a directory server for communicating with one or more of the principals to authenticate each of the principals and to provide access control, the multi-master directory controlling access on a per object and per attribute basis, the communication system comprising:

an event server coupled to the plurality of principals for registering the plurality of principals and for determining whether the principals are authorized to produce certain events when the principals are functioning as publishers and whether the principals are authorized to receive the certain events when the principals are functioning as subscribers; and means in the event server for creating a group session key for establishing one of the multicast groups, by distributing the group session key in an encrypted message to the subscribers, the encrypted message encapsulating the group session key according to a prescribed format;

means in the event server for updating the group session key by utilizing a change password protocol to modify an object in the directory;

means in the event server for notifying the subscribers to reregister in response to the updating of the group session key.

11. The communication system as recited in claim 10, wherein the directory server is collocated with the event server, the directory server and the event server participating in a common one of the multicast groups.

12. The communication system as recited in claim 10, wherein the prescribed format of the message conforms with lightweight directory access protocol (LDAP).

13. The communication system as recited in claim 10, wherein the directory authenticates by controlling access in conjunction with utilizing an external authentication service that allows extending membership of the multicast groups to subscribers with no corresponding objects in the directory.

14. The communication system as recited in claim 13, wherein the external authentication service is supplied by a Kerberos server.

15. The communication system as recited in claim 10, wherein the prescribed format of the message comprises a protocol version number field, a message type field, and a message length field.

16. The communication system as recited in claim 10, wherein the event server manages the private keys.

17. The communication system as recited in claim 10, wherein the event server updates the group session key by performing the steps of:

creating a new group session key;

modifying the object based upon the new group session key by using the change password protocol;

sending a new message that contains the new group session key to the subscribers; and notifying the subscribers to reregister.

18. The communication system as recited in claim 10, wherein the event server performs access control check of the subscribers during registration of the subscribers.

19. A computer system functioning as an event server and for establishing multiple secure multicast groups, the computer system comprising:

a communication interface for communicating with a plurality of nodes and for interfacing a multi-master directory to authenticate the computer system and the plurality of nodes, the multi-master directory having access controls on a per object and per attribute basis, wherein the nodes access the directory to determine events that the nodes may process;

a bus coupled to the communication interface for transferring data;

one or more processors coupled to the bus for selectively generating a group session key and private keys corresponding to the plurality of nodes, the group session key being updated by utilizing a change password protocol to modify an object corresponding to the events in the directory;

an event server that is executed by the one or more processors; and a memory coupled to the one or more processors via the bus, the memory including one or more sequences of instructions which when executed by the one or more processors cause the one or more processors to perform the steps of registering the plurality of nodes, determining whether the nodes are authorized to produce and authorized to receive certain events corresponding to objects of the directory, distributing the group session key to the nodes via a message, the message encapsulating the group session key according to a prescribed format, and selectively reregistering the nodes in response to updating the group session key.

20. The computer system as recited in claim 19, wherein the directory is collocated with the event server, the directory and the event server participating in a common one of the multicast groups.

21. The computer system as recited in claim 19, wherein the prescribed format of the message conforms with light weight directory access protocol (LDAP).

22. The computer system as recited in claim 19, wherein the directory authenticates by using authentication services of the directory in conjunction with a Kerberos service that allows extending membership to the multicast groups to nodes with no objects in the directory.

23. The computer system as recited in claim 19, wherein the event server manages the private keys of the plurality of nodes.

24. The computer system as recited in claim 19, wherein the event server updates the group session key by performing the steps of:

creating a new group session key;

modifying the object based upon the new group session key by using a change password protocol;

sending a new message that contains the new group session key to the subscribers; and notifying the subscribers to reregister.

25. The computer system as recited in claim 19, wherein the computer system performs access control check of the nodes during registration.

26. A computer-readable medium carrying one or more sequences of instructions for securely establishing communication in a multicast group of nodes of a network, in which the network includes publisher nodes, subscriber nodes, a multi-master directory that stores information about events in the network and that can authenticate the subscriber nodes and the publisher nodes, whereby each of the subscriber nodes and the publisher nodes receives a unique private key and that can determine events that the subscribers and the publishers may process, wherein execution of the one or more sequences of instructions by one or more processors causes the one or more processors to perform the steps of:

registering the subscribers and the publishers with an event server, the event server determining whether the publishers are authorized to produce certain events corresponding to event types and whether the subscribers are authorized to receive the certain events in response to the step of registering; and generating a group session key for establishing the multicast group, the group session key being encrypted in a first message that has a prescribed format.

27. A computer-readable medium as recited in claim 26, further comprising the steps of:

receiving a second message from the subscribers in response to the subscribers determining whether the first message corresponds to a correct key version;

updating the group session key; and selectively reregistering the subscribers at the event server.

28. A computer-readable medium as recited in claim 26, wherein the directory authenticates by controlling access in conjunction with utilizing an external authentication service that allows extending membership of the multicast groups to subscribers with no corresponding objects in the directory.

29. A computer-readable medium as recited in claim 27, wherein the step of updating comprises:

creating a new group session key;

modifying an object in the directory based upon the new group session key by using a change password protocol;

sending a new message that contains the new group session key to the subscribers; and notifying the subscribers to reregister.

30. A computer-readable medium as recited in claim 26, wherein the step of registering comprises performing access control check of the subscribers by the event server.

\* \* \* \* \*